United States Patent [19]

Akai et al.

[11] Patent Number: 5,203,367
[45] Date of Patent: Apr. 20, 1993

[54] APPARATUS FOR SUPPLYING LIQUID UNDER CONSTANT PRESSURE

[75] Inventors: Tadao Akai; Hiromichi Nishino, both of Tokushima, Japan

[73] Assignee: Shikoku Kakoki Co., Ltd., Tokushima, Japan

[21] Appl. No.: 889,333

[22] Filed: May 28, 1992

[30] Foreign Application Priority Data

May 29, 1991 [JP] Japan .................................. 3-38628[U]

[51] Int. Cl.$^5$ ............................................. B67D 5/00
[52] U.S. Cl. ............................... 137/101.25; 137/563; 137/428
[58] Field of Search .............. 137/563, 101.25, 101.27, 137/574, 428

[56] References Cited

U.S. PATENT DOCUMENTS

| 2,767,732 | 10/1956 | Hodgson | 137/428 X |
| 2,809,752 | 10/1957 | Leslie | 137/428 U X |
| 2,930,393 | 3/1960 | Starling | 137/574 X |
| 3,553,740 | 1/1971 | Fogg | 137/428 |
| 3,987,816 | 10/1976 | Lange | 137/563 |
| 4,090,530 | 5/1978 | Lange | 137/574 X |

Primary Examiner—Alan Cohan
Attorney, Agent, or Firm—Armstrong, Westerman, Hattori, McLeland & Naughton

[57] ABSTRACT

An apparatus for supplying a liquid under a constant pressure comprising a supply tank disposed at a higher lever than articles, i.e., containers, to be supplied with the liquid, an overflow plate partitioning the interior of the supply tank into a main tank compartment and an auxiliary tank compartment, a supply pipe having an upper end connected to the main tank compartment and a lower end position to oppose the container, replenishing means for supplying a replenishment of the liquid to the main tank compartment at a rate in excess of the rate of supply by the supply pipe per unit time, means for transferring the liquid from the auxiliary tank compartment to the main tank compartment at a rate in excess of the rate of supply, and control means for operating the replenishing means and stopping the transferring means upon the liquid level in the auxiliary tank compartment reaching a predetermined low level and for stopping the replenishing means and operating the transferring means upon the liquid level reaching a predetermined high level.

4 Claims, 1 Drawing Sheet

APPARATUS FOR SUPPLYING LIQUID UNDER CONSTANT PRESSURE

BACKGROUND OF THE INVENTION

The present invention relates to an apparatus for supplying a liquid under a constant pressure, for example, for use in supplying a liquid to containers each in a specified amount while the containers are being transported by a conveyor.

Such apparatus are already known which comprise a supply tank having a supply outlet, a pressurizing unit for supplying pressure air to the supply tank, and a control unit for controlling the pressure of the air in accordance with alterations of the level of a liquid in the supply tank so as to give a constant pressure to the liquid flowing out from the supply outlet.

The conventional apparatus requires pressure air and is therefore complex and expensive. The apparatus is further cumbersome to handle because there is a need to input initial data, such as the liquid level, to the control unit.

The main object of the present invention is to provide an apparatus for supplying a liquid under a constant pressure which requires no pressure air and which is inexpensive and easy to handle.

The apparatus of the invention for supplying a liquid under a constant pressure comprises a supply tank disposed at a higher level than articles to be supplied with the liquid, an overflow plate partitioning the interior of the supply tank into a main tank compartment and an auxiliary tank compartment, a supply pipe having an upper end connected to the main tank compartment and a lower end positioned to oppose the article, replenishing means for supplying a replenishment of the liquid to the main tank compartment at a rate in excess of the rate of supply by the supply pipe per unit time, means for transferring the liquid from the auxiliary tank compartment to the main tank compart at a rate in excess of the rate of supply, and control means for operating the replenishing means and stopping the transferring means upon the liquid level in the auxiliary tank compartment reaching a predetermined low level and for stopping the replenishing means and operating the transferring means upon the liquid level reaching a predetermined high level.

With the apparatus of the present invention, the replenishing means and the transferring means are brought into and out of operation as controlled in accordance with the liquid level in the auxiliary tank compartment. The liquid is supplied to the main tank compartment at a rate in excess of the rate of supply by the supply pipe per unit time, by the replenishing means while this means is in operation or by the transferring means while the replenishing means is out of operation. Accordingly, the main tank compartment is always in an overflow state, permitting the liquid to maintain a constant level therein and giving a constant pressure to the liquid to be supplied to articles (containers) through the supply pipe. Accordingly, the liquid supplying apparatus provided requires no pressure air and is inexpensive and easy to handle.

BRIEF DESCRIPTION OF THE DRAWINGS

The drawing is a diagram showing the construction of an apparatus embodying the invention.

DESCRIPTION OF THE PREFERRED EMBODIMENT

Figure 1:
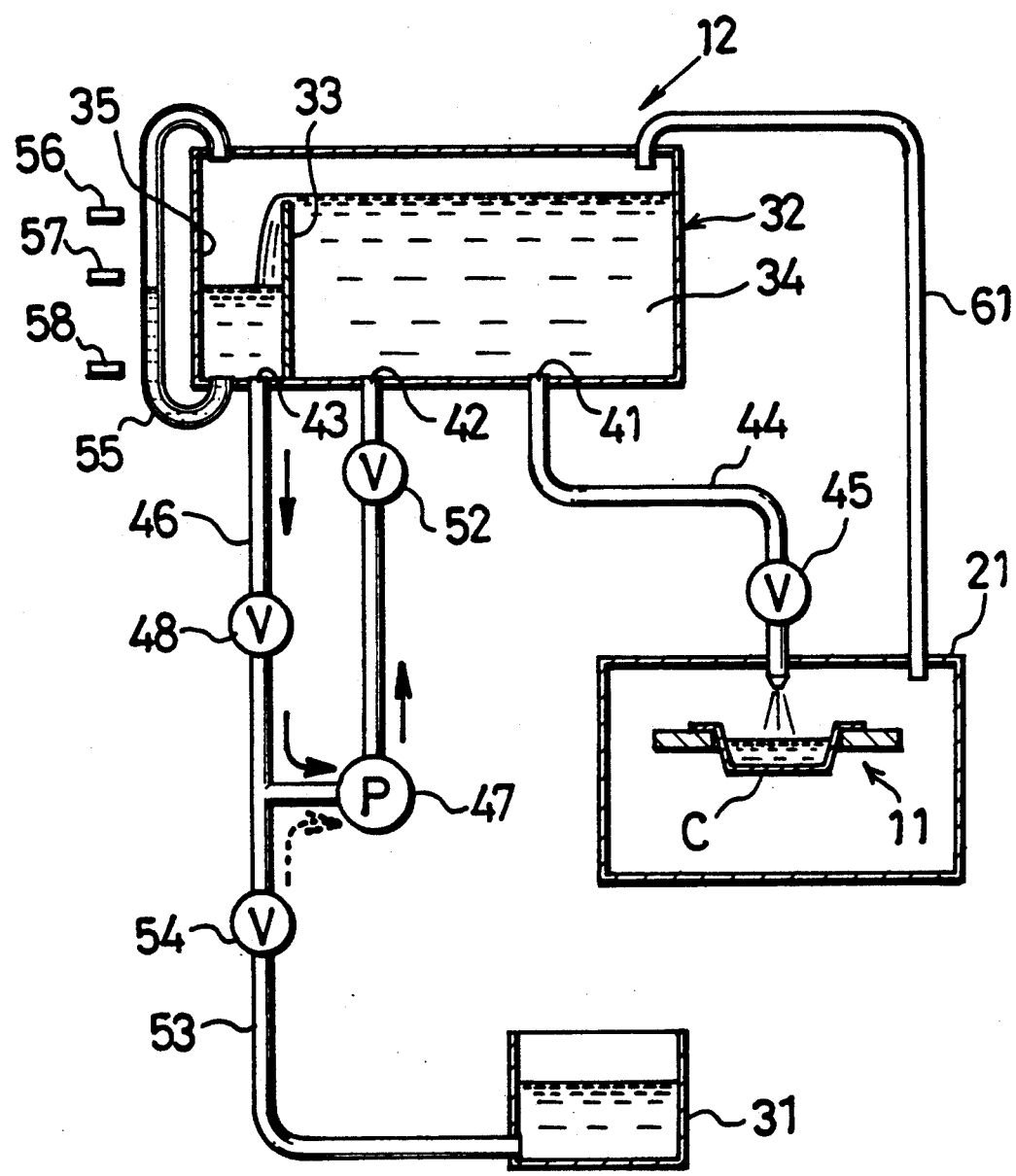

An embodiment of the invention will be described below with reference to the drawing.

The drawing shows a container transport conveyor 11, and an apparatus 12 for supplying a liquid to containers C while the container is being transported by the conveyor 11.

The conveyor is accommodated in a closed aseptic chamber 21. The chamber 21 serves to separate a required packing work space from the outside air, and is filled with aseptic air and maintained at a slightly increased pressure.

The supplying apparatus 12 comprises a reservoir tank 31 and a liquid supply tank 32. The supply tank 32 is closed and has its interior partitioned by an overflow plate 33 into a main tank compartment 34 and an auxiliary tank chamber 35. In capacity, the main tank compartment 34 is much greater than the auxiliary tank compartment 35.

The main tank compartment 34 has a bottom wall which is formed with a supply outlet 41 and an inlet 42. The auxiliary tank compartment 35 has a bottom wall formed with an outlet 43.

A supply pipe 44 has one end connected to the supply outlet 41 and the other end extending into the aseptic chamber 21 and positioned above the path of transport of containers C. The supply pipe 44 has a first electromagnetic shutoff vale 45.

A replenishing pipe 53 has one end in communication with the inlet 42 and the other end communicating with the reservoir tank 31. The replenishing pipe 53 has a gear pump 47, a second electromagnetic shutoff valve 54 positioned upstream from the pump 47 and a flow control valve 52 downstream from the pump.

A transfer pipe 46 has one end communicating with the outlet 43 and the other end in communication with the intake side of the pump 47. The transfer pipe 46 has a third electromagnetic shutoff valve 48.

The top wall and the bottom wall of the auxiliary tank compartment 35 are interconnected by a transparent pipe 55 having a bend at each end and including a vertical portion. Arranged along this portion are a high level sensor 56, intermediate level sensor 57 and low level sensor 58. These sensors 56 to 58 each comprise a photoelectric tube.

The aseptic chamber 21 is held in communication with the supply tank 32 by an equalizing pipe 61. If the conveyor 11 is not enclosed in the aseptic chamber 21 but exposed to the outside air, the equalizing pipe 61 need not be provided.

Now suppose the main tank compartment 34 is filled with a liquid, permitting the liquid to flow out in a specified amount at a time from the supply outlet via the first valve 45 which is opened and closed, and the liquid level in the auxiliary tank compartment 35 is positioned between a high level and a low level. At this time, the second valve 54 is held closed, the third valve 48 is open, and the liquid is circulated through the main and auxiliary tank compartments 34, 35. The rate of circulation is set to a value in excess of the amount of liquid flowing out from the supply outlet 41 per unit time. Although the overall amount of liquid in the supply tank 32 deceases as the liquid flows out from the supply outlet 41, the main tank compartment 34 remains filled up, with the liquid level therein remaining unchanged, while the liquid level in the auxiliary tank compartment gradually lowers.

During the descent of the liquid level in the auxiliary tank compartment 35, the low level sensor 58 detects the level to produce a detection signal. The second valve 54 is opened and the third valve 48 is closed in response to the signal. This discontinues the circulation of liquid and supplies a liquid replenishment from the reservoir tank 31 to the main compartment 34 of the supply tank 32. The replenishing rate is equal to the circulation rate. Although the main tank compartment 34 remains filled up with the liquid which remains at the definite level as in the period of circulation, the overall amount of liquid in the supply tank 32 consequently increases to gradually raise the liquid level in the auxiliary tank compartment 35.

During the ascent of the liquid level in the compartment 35, the high level sensor 56 detects this level, whereupon the second valve 54 is closed again and the third valve 48 is opened in response to the resulting detection signal, discontinuing the replenishment from the reservoir tank 31 and starting the circulation again.

During the descent of the liquid level described, the time taken for the liquid level to descend from the intermediate level of the sensor 57 to the low level of the sensor 58 or from the high level of the sensor 56 to the low level of the sensor 58 is measured, whereby the amount of supply is measured.

What is claimed is:

1. An apparatus for supplying a liquid under a constant pressure comprising:
    a supply tank disposed at a higher level than articles to be supplied with the liquid,
    an overflow plate partitioning the interior of the supply tank into a main tank compartment and an auxiliary tank compartment,
    a supply pipe having an upper end connected to the main tank compartment and a lower end positioned to oppose the article,
    replenishing means for supplying a replenishment of the liquid to the main tank compartment at a rate in excess of the rate of supply by the supply pipe per unit time,
    means for transferring the liquid from the auxiliary tank compartment to the main tank compartment at a rate in excess of the rate of supply, and
    control means for operating the replenishing means and stopping the transferring means upon the liquid level in the auxiliary tank compartment reaching a predetermined low level and for stopping the replenishing means and operating the transferring means upon the liquid level reaching a predetermined high level.

2. An apparatus as defined in claim 1 wherein a supply station is positioned below an opening of the lower end of the supply pipe, and the articles are containers to be transported by an intermittently driven conveyor so as stop successively at the supply station, the supply pipe being provided with a first shutoff valve to be opened or closed in synchronism with the movement of the intermittently driven conveyor.

3. An apparatus as defined in claim 2 wherein the conveyor is accommodated in a closed aseptic chamber, and the supply tank is closed, an equalizing pipe being connected at one end thereof to the aseptic chamber and at the other end thereof to the supply tank.

4. An apparatus as defined in claim 1 wherein the replenishing means comprises a replenishing pipe connected at one end thereof to a reservoir tank and at the other end thereof to the main tank compartment, and a pump provided on the replenishing pipe, and the transferring means comprises a transferring pipe connected at one end thereof to the auxiliary tank compartment and at the other end thereof to the intake side of the pump, the control means comprising a low level sensor for producing a low level detection signal upon detecting the liquid level in the auxiliary tank compartment reaching the predetermined low level, a high level sensor for producing a high level detection signal upon detecting the liquid level reaching the predetermined high level, a second shutoff valve provided on the replenishing pipe at a position upstream from the pump thereon and openable in response to the low level detection signal, the second shutoff valve being closable in response to the high level detection signal, and a third shutoff valve provided on the transferring pipe and closable in response to the low level detection signal, the third shutoff valve being openable in response to the high level detection signal.

* * * * *